Patented Nov. 2, 1943

2,333,214

UNITED STATES PATENT OFFICE 2,333,214

RUBBER HYDROHALIDE

Charles A. Thomas and Herbert E. Morris, Dayton, Ohio, assignors to Monsanto Chemical Company, St. Louis, Mo., a corporation of Delaware

No Drawing. Application November 15, 1940, Serial No. 365,770

7 Claims. (Cl. 260—771)

The present invention relates to rubber hydrohalides such as rubber hydrochlorides and relates particularly to an improved method of forming such products by the use of complex addition compounds of hydrogen halides and 1,4-dioxane (also designated as diethylene oxide, p-dioxane or tetrahydro-p-dioxin or simply as dioxane).

The principal object of the invention is to provide an improved process of making rubber hydrohalides. Other objects and advantages of the invention, some of which are referred to specifically hereinafter, will be apparent to those skilled in the art.

In our copending application, Serial No. 208,486, filed May 17, 1938, which issued as Patent No. 2,285,473, of which this application is a continuation-in-part, we have disclosed the use of complex addition compounds of hydrogen halides and dioxane for facilitating reactions involving the reaction of hydrogen halides with rubber and unsaturated organic compounds. By the use of this novel process, the reaction of the hydrogen halide is facilitated, the reaction period is shortened, and the reactions can be controlled to proceed with a diminished formation of undesirable products.

The advantageous results of the present invention depend from the discovery that dioxane forms addition complexes with hydrogen halides of the formula $C_4H_8O_2 \cdot HX$, in which X represents halogen. However, in using this complex, greater than the mol for mol ratios indicated by the formula may be and preferably are used. The complex forms in the presence of water and hence aqueous solutions of hydrogen halides may be used for its preparation. The formation of a complex addition product is established by the following observations. When hydrogen chloride is passed into dioxane considerable evolution of heat occurs. Similarly there is considerable evolution of heat when dioxane is aded to concentrated aqueous hydrochloric acid. Approximately 41.7 grams of hydrogen chloride are retained by 100 grams of dioxane and the resulting compound forms crystals at about —40° C. The crystals on rewarming do not lose any appreciable weight. The compound is an addition compound, therefore, and not a mere solution of hydrogen chloride in dioxane.

Chlorinated and hydrochlorinated rubbers are known to the art. Hydrochlorinated rubbers have properties which adapt them for uses where chlorinated rubbers are not entirely satisfactory, for instance, for the production of wrapping foil, seals for milk bottles, special coating compositions, and the like.

The methods which have heretofore been used for the production of rubber hydrochlorides have been similar to the prior methods used for the production of chlorinated rubber. The rubber was dissolved in a chlorinated hydrocarbon solvent such as chloroform or an aromatic hydrocarbon solvent and then submitted to the action of chlorine or hydrogen chloride. This general method was unsatisfactory for the production of rubber hydrochlorides because it required pressure, since hydrogen chloride is not soluble in chlorinated hydrocarbon solvents to a sufficient extent. This disadvantage was avoided by using a solvent mixture in which hydrogen chloride was soluble. Solvents in which the rubber was soluble and the rubber hydrochloride was insoluble could also be used. Another alternative process for the production of rubber hydrochloride which was proposed to avoid some of these difficulties consisted in immersing the rubber in the form of thin sheets in a solution of hydrogen chloride in a solvent such as ethyl acetate which has no substantial solvent action on rubber. The reaction of rubber with dry gaseous or liquefied hydrogen chloride in the absence of a solvent or diluent is not easy to control to obtain homogeneous products and the processes which depend upon the use of solvents, have not been entirely satisfactory.

We have now discovered that rubber hydrohalides may be made by simple reaction of rubber with the complex addition products of hydrogen halides and dioxane in the substantial absence of any extraneous solvent. Such procedure approaches in simplicity the reaction between dry gaseous or liquefied hydrogen chloride and rubber, which is not capable of being conducted on a commercial scale to yield a homogeneous product of uniform characteristics. It, furthermore, avoids the use of large amounts of solvents during the reaction. The reaction between rubber and the complex addition compounds is smooth and easily controlled and yields a homogeneous product of substantially uniform characteristics. The improved process of the invention provides a great economic advantage in the use of hydrogen halides for formation of rubber hydrohalides.

According to the process of the present invention, the reaction between rubber and the complex addition product of dioxane and a hydrogen halide is effected by milling rubber together with the complex addition compound in a Banbury or similar mixer or on rolls or it may be treated in the form of films with the complex addition compound of dioxane and the hydrogen halide. The temperature of the treatment and the degree of milling or compounding is subject to rather wide variation but, since rubber hydrohalides are thermally unstable, it is preferred that the treatment be conducted at temperatures not much in excess of 20° to 30° C., and preferably within the range of 5° to 15° C. At higher temperatures hydrogen chloride may be lost and undesirable products may form. The final character of the rubber hydrohalide will be governed by factors such as the amount of the complex addition product of dioxane and the hydrogen halide used, the rate at which it is added to the rubber during treatment, the temperature of treatment, the degree of milling or compounding, the character and purity of the starting material and the degree of purification to which the final product is submitted.

The reaction between rubber and hydrogen chloride may be written in its simplest form as:

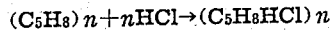

$$(C_5H_8)n + nHCl \rightarrow (C_5H_8HCl)n$$

The theoretical chlorine content of rubber hydrochloride is 33.9% chlorine by weight. Commercial products and the products made according to our invention contain from 25 to 33% chlorine and the better products fall within the range of 29 to 31% chlorine. According to the simple equation of the reaction 100 parts of pure rubber will require 53.57 parts by weight of hydrogen chloride or 183 parts by weight of the pure complex addition compound of dioxane and hydrogen chloride ($C_4H_8O_2 \cdot HCl$ having a hydrogen chloride content of 29.28% or 41.4 parts of hydrogen chloride to 100 parts of dioxane by weight). In practice, however, the rubber is usually contaminated with varying proportions of resins, proteins, and other substances and the solutions of hydrogen chloride in dioxane which are used may contain varying proportions of the complex addition compound of dioxane and hydrogen chloride, hence these factors must be taken into account. Furthermore, it is desirable to use an excess of the complex addition compound of dioxane and hydrogen chloride or other hydrogen halide.

Hydrogen chloride in water or in other solvents does not react as readily or to the same degree with rubber as do the complex addition compounds of dioxane and hydrogen halides. For example, hydrochloric acid (a concentrated solution of hydrogen chloride in water) reacts slowly and is without any substantial effect on crepe rubber for long periods of time. The activity of the complex addition compounds of dioxane and hydrogen halides was entirely unexpected. It was furthermore discovered that the activity of these complex addition compounds toward rubber is reduced in the presence of water and that, therefore, in the practice of this invention the presence of substantial amounts of water or solvents which have an adverse effect on the reaction is to be avoided. Preferably, the complex addition compound is made by passing the hydrogen halide into dioxane and thereafter treating the rubber with an amount of the solution in dioxane somewhat in excess of the quantity stoichiometrically required to form the hydrohalide. It is not necessary to add the entire amount of hydrogen halide to dioxane to convert all the dioxane into the complex addition compound, as long as the content of hydrogen halide in the dioxane is taken into account, since excess dioxane has little effect on the activity of the compound with rubber.

After the reaction of the rubber with the complex addition compound of dioxane and the hydrogen halide, the excess dioxane may be removed from the product by washing the product with solvents such as acetone. If the solvent used for washing the dioxane from the product is not a solvent for hydrogen chloride, washings with water or dilute alkali solutions or similar solvents or absorbents for hydrogen chloride may be desirable. The product can be further purified by conventional methods, for example, by dissolving the product in benzene and thereafter precipitating the rubber hydrohalide from the solution by adding alcohol thereto.

The rubber which may be treated according to the present invention for the production of hydrogen halides may be rubber latex, gutta percha, balata, smoked sheets, crepe, milled or reclaimed rubber. Preferably rubber which has been purified by extraction of proteins and resins is used; milled rubber is somewhat more reactive than crepe rubber or sheets. Vulcanized rubber may be used but, since it contains sulfur compounds, yields a product of slightly inferior characteristics. Unless otherwise specified, it is to be understood that the term "rubber" as used herein is employed in a generic sense and includes such products.

Typical methods of practicing the invention are illustrated in the examples which follow.

*Example 1*

In a preferred method of practicing the invention, rubber is milled in a Banbury mixer at or about room temperature. While the milling progresses, dioxane to which had been added hydrogen chloride so that the mixture contains about 25% hydrogen chloride, is slowly added. Addition of the dioxane-hydrogen chloride mixture is stopped when 2.25 times the original weight of the rubber has been added and milling is continued for a short period thereafter as determined by the character of the product. The product is dropped onto a fine screen or filter to remove excess dioxane and then washed with acetone. Suction or steaming may be used to obtain more thorough removal of solvents. The product is then ready for molding or sheeting in the conventional manner, with or without the addition of compounding ingredients such as fillers, coloring matter, stabilizers and the like. If desired the product may be submitted to further purification as herein-above described.

*Example 2*

In another method of practicing the invention, crepe rubber which has been swelled with a small amount of benzene until it has the consistency of a set jelly is agitated with an amount of a 25% solution of hydrogen chloride in dioxane equal to 2.2 times the weight of the rubber contained in the jell. The product is subsequently submitted to washing to remove benzene and dioxane and may be used in the same way as in Example 1.

*Example 3*

In another embodiment of the invention, rubber latex is agitated with 2.0 times its weight of a 25% solution of hydrogen chloride in dioxane. Recovery of rubber hydrochloride can be made as in Example 1.

Although the foregoing examples constitute preferred embodiments of the invention it is to be understood that the invention is not limited thereto. The specification is restricted largely to processes for the hydrochlorination of rubber but it is obvious that it is applicable to the reaction of other hydrogen halides such as hydrogen fluoride, hydrogen bromide and hydrogen iodide. Other modifications and variations, which are necessary for adapting the process of the invention to related uses, are contemplated. The scope of the invention is therefore limited solely by the appended claims.

We claim:

1. In the process of producing a rubber hydrohalide from rubber, the improvement which comprises subjecting the rubber to intimate contact with a complex addition product of dioxane and a hydrogen halide in an amount less than that required to dissolve the rubber completely and in excess of that required to combine with the rubber in the proportion of one molecular equivalent of hydrogen halide to one molecular equivalent of rubber calculated as isoprene ($C_5H_8$) and continuing the contacting until the product is substantially a rubber monohydrohalide.

2. The process of producing a rubber hydrohalide which comprises intimately contacting rubber with a solution of a hydrogen halide in dioxane in an amount less than that required to dissolve the rubber completely and in excess of that required to combine with the rubber in the proportion of one molecular equivalent of hydrogen halide to one molecular equivalent of rubber calculated as isoprene ($C_5H_8$) and continuing the contacting until the product is substantially a rubber monohydrohalide.

3. The process of producing a rubber hydrohalide which comprises intimately contacting rubber with a complex addition product of dioxane and a hydrogen halide in an amount less than that required to dissolve the rubber completely and in excess of that required to combine with the rubber in the proportion of one molecular equivalent of hydrogen halide to one molecular equivalent of rubber calculated as isoprene ($C_5H_8$) and continuing the contacting until the product is substantially a rubber monohydrohalide.

4. The process of producing rubber hydrochloride which comprises intimately contacting rubber with a complex addition product of dioxane and hydrogen chloride in an amount less than that required to dissolve the rubber completely and in excess of that required to combine with the rubber in the proportion of one molecular equivalent of hydrogen chloride to one molecular equivalent of rubber calculated as isoprene ($C_5H_8$) and continuing the contacting until the product is substantially rubber monohydrochloride.

5. The process of producing rubber hydrochloride which comprises milling rubber with an amount of a solution of hydrogen chloride in dioxane in an amount less than that required to dissolve the rubber completely and in excess of that required to combine with the rubber in the proportion of one molecular equivalent of hydrogen chloride to one molecular equivalent of rubber calculated as isoprene ($C_5H_8$) and continuing the milling until the product is substantially rubber monohydrochloride.

6. The process of producing rubber hydrochloride which comprises milling rubber at a temperature below approximately 30° C. with an amount of a solution of hydrogen chloride in dioxane in an amount less than that required to dissolve the rubber completely and in excess of that required to combine with the rubber in the proportion of one molecular equivalent of hydrogen chloride to one molecular equivalent of rubber calculated as isoprene ($C_5H_8$) and continuing the milling until the product contains from 25 to 33% of chlorine and thereafter removing the dioxane and unreacted hydrogen chloride.

7. The process of producing rubber hydrofluoride which comprises intimately contacting rubber with a complex addition product of dioxane and hydrogen fluoride in an amount less than that required to dissolve the rubber completely and in excess of that required to combine with the rubber in the proportion of one molecular equivalent of hydrogen fluoride to one molecular equivalent of rubber calculated as isoprene ($C_5H_8$) and continuing the contacting until the product is substantially rubber monohydrofluoride.

CHARLES A. THOMAS.
HERBERT E. MORRIS.